US 11,731,499 B2

(12) United States Patent
Hoesl et al.

(10) Patent No.: US 11,731,499 B2
(45) Date of Patent: Aug. 22, 2023

(54) DRIVE TRAIN FOR A MOTOR VEHICLE, IN PARTICULAR FOR A CAR, AND METHOD FOR OPERATING SUCH A DRIVE TRAIN

(71) Applicant: Bayerische Motoren Werke Aktiengesellschaft, Munich (DE)

(72) Inventors: Andreas Hoesl, Munich (DE); Holger Jeebe, Forstinning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 202 days.

(21) Appl. No.: 17/045,335

(22) PCT Filed: Apr. 26, 2019

(86) PCT No.: PCT/EP2019/060827
§ 371 (c)(1),
(2) Date: Oct. 5, 2020

(87) PCT Pub. No.: WO2019/228720
PCT Pub. Date: Dec. 5, 2019

(65) Prior Publication Data
US 2021/0023929 A1    Jan. 28, 2021

(30) Foreign Application Priority Data
May 28, 2018 (DE) ...................... 10 2018 208 425.5

(51) Int. Cl.
B60K 6/26        (2007.10)
B60W 20/19      (2016.01)
(Continued)

(52) U.S. Cl.
CPC ................. B60K 6/26 (2013.01); B60K 6/48 (2013.01); B60W 10/06 (2013.01); B60W 10/08 (2013.01);
(Continued)

(58) Field of Classification Search
CPC ........... B60K 6/26; B60K 6/46; B60W 10/06; B60W 10/08; B60W 20/11; B60W 20/15; B60W 20/19
See application file for complete search history.

(56) References Cited

U.S. PATENT DOCUMENTS 6,083,138 A    7/2000  Aoyama et al.
8,731,762 B1   5/2014  Wang et al.
(Continued)

FOREIGN PATENT DOCUMENTS

CN    105292104 A     2/2016
DE    197 22 808 A1   12/1998
(Continued)

OTHER PUBLICATIONS

International Search Report (PCT/ISA/210) issued in PCT Application No. PCT/EP2019/060827 dated Jul. 17, 2019 with English translation (four (4) pages).
(Continued)

Primary Examiner — Jeffrey J Restifo
(74) Attorney, Agent, or Firm — Crowell & Moring LLP

(57) ABSTRACT

A drive train for a motor vehicle has at least one internal combustion engine with an output shaft for providing torques for driving the motor vehicle and having a full load curve, and at least one electrical machine with an electrical operating voltage of at most 60 volts that is designed to drive the output shaft in order to assist the internal combustion engine in driving the motor vehicle. The drive train has at least one first operating state in which the electrical machine assists the internal combustion engine in driving the motor vehicle in at least one rotational speed range of the internal combustion engine such that a torque provided by the output shaft exceeds the full load curve and falls below the maximum torque of the full load curve; and/or at least one second operating state in which the electrical machine assists the (Continued)

internal combustion engine in driving the motor vehicle such that a torque provided by the output shaft exceeds the full load curve and the maximum torque of the full load curve.

12 Claims, 1 Drawing Sheet

(51) Int. Cl.
*B60K 6/48* (2007.10)
*B60W 10/06* (2006.01)
*B60W 10/08* (2006.01)

(52) U.S. Cl.
CPC ....... *B60W 20/19* (2016.01); *B60W 2720/106* (2013.01)

(56) References Cited

U.S. PATENT DOCUMENTS

| | | | |
|---|---|---|---|
| 9,637,109 B1* | 5/2017 | Johri | B60W 20/10 |
| 9,771,063 B2* | 9/2017 | Nefcy | B60K 6/48 |
| 10,730,387 B2* | 8/2020 | Vollmer | B60K 6/48 |
| 11,014,549 B1* | 5/2021 | Bonny | B60W 30/18127 |
| 2007/0278021 A1 | 12/2007 | Pott et al. | |
| 2009/0088944 A1 | 4/2009 | Aswani et al. | |
| 2010/0032219 A1* | 2/2010 | Udagawa | B60L 50/61 60/431 |
| 2012/0174708 A1* | 7/2012 | Nagamori | B60L 50/16 74/665 F |
| 2012/0191280 A1* | 7/2012 | Ohno | B60K 6/46 180/65.265 |
| 2013/0085633 A1* | 4/2013 | Ohno | B60W 10/06 180/65.265 |
| 2013/0190132 A1* | 7/2013 | Izawa | B60W 10/08 180/65.265 |
| 2013/0199464 A1 | 8/2013 | Burr | |
| 2014/0067183 A1 | 3/2014 | Sisk | |
| 2015/0006009 A1* | 1/2015 | Okada | B60W 20/50 701/22 |
| 2015/0134160 A1* | 5/2015 | Liang | B60W 30/18054 180/65.265 |
| 2015/0202965 A1* | 7/2015 | Gabor | B60L 7/18 701/70 |
| 2015/0360678 A1 | 12/2015 | Le Roy et al. | |
| 2016/0001764 A1* | 1/2016 | Iwase | B60L 50/61 903/910 |
| 2016/0009270 A1* | 1/2016 | Zhang | B60W 20/19 180/65.265 |
| 2016/0076227 A1* | 3/2016 | Hoshino | B60L 15/20 180/65.265 |
| 2016/0090076 A1* | 3/2016 | Tsuji | B60K 6/36 180/65.265 |
| 2016/0244047 A1* | 8/2016 | Tsuchida | B60K 6/445 |
| 2017/0282702 A1* | 10/2017 | Kim | B60K 6/40 |
| 2017/0291597 A1* | 10/2017 | Hata | B60W 10/06 |
| 2017/0327005 A1* | 11/2017 | Meyer | B60W 10/08 |
| 2018/0111601 A1* | 4/2018 | Kamatani | B60W 20/40 |
| 2018/0273019 A1* | 9/2018 | Johri | B60W 10/08 |
| 2019/0092316 A1* | 3/2019 | Yukawa | B60K 6/48 |
| 2019/0135263 A1* | 5/2019 | Sato | B60K 6/46 |
| 2019/0152470 A1* | 5/2019 | Liu | B60W 10/06 |
| 2019/0256075 A1* | 8/2019 | Nishii | B60L 50/14 |
| 2019/0389453 A1* | 12/2019 | Konishi | B60K 6/26 |
| 2020/0001696 A1 | 1/2020 | Lazarenka et al. | |
| 2020/0016986 A1* | 1/2020 | Li | B60W 30/18027 |
| 2020/0070810 A1* | 3/2020 | Hashimoto | B60W 20/00 |
| 2020/0290594 A1* | 9/2020 | Pettersson | B60K 6/26 |
| 2020/0313586 A1* | 10/2020 | Gopalakrishnan | B60L 50/60 |
| 2020/0339097 A1* | 10/2020 | Kurosawa | B60W 20/13 |
| 2020/0376949 A1* | 12/2020 | Furukawa | B60K 6/28 |
| 2020/0391742 A1* | 12/2020 | Ariyoshi | B60W 20/17 |
| 2021/0008971 A1* | 1/2021 | Toda | B60K 6/442 |
| 2021/0016765 A1* | 1/2021 | Toda | B60L 9/18 |
| 2021/0023929 A1* | 1/2021 | Hoesl | B60W 20/19 |
| 2021/0023933 A1* | 1/2021 | Li | B60W 10/107 |
| 2021/0044230 A1* | 2/2021 | Piper | B60K 6/46 |
| 2021/0070388 A1* | 3/2021 | Matsuda | B60W 20/10 |
| 2021/0155222 A1* | 5/2021 | Taitz | B60W 10/02 |
| 2021/0171010 A1* | 6/2021 | Hagimoto | B60L 15/04 |
| 2021/0179070 A1* | 6/2021 | Ademane | B60K 6/48 |
| 2021/0179071 A1* | 6/2021 | Kuras | B60K 6/26 |
| 2021/0197791 A1* | 7/2021 | Maeda | B60W 20/00 |

FOREIGN PATENT DOCUMENTS

| | | |
|---|---|---|
| DE | 10 2006 012 860 A1 | 9/2007 |
| DE | 10 2006 019 031 A1 | 10/2007 |
| DE | 10 2008 027 620 A1 | 4/2009 |
| DE | 10 2010 046 048 A1 | 3/2012 |
| DE | 10 2012 001 740 A1 | 8/2013 |
| DE | 10 2014 105 424 A1 | 10/2014 |
| DE | 10 2014 220 862 A1 | 4/2016 |
| DE | 10 2016 217 955 A1 | 3/2018 |
| DE | 10 2017 124 357 A1 | 4/2018 |
| EP | 1 253 036 A1 | 10/2002 |
| EP | 1 712 395 A2 | 10/2006 |
| WO | WO 2013/075139 A1 | 5/2013 |

OTHER PUBLICATIONS

German-language Written Opinion (PCT/ISA/237) issued in PCT Application No. PCT/EP2019/060827 dated Jul. 17, 2019 (five (5) pages).
German-language Search Report issued in German Application No. 10 2018 208 425.4 dated Jan. 29, 2019 with partial English translation (14 pages).
German-language Office Action issued in German Application No. 10 2018 208 425.4 dated Jan. 29, 2019 (five (5) pages).
Deppe P., "Blick Auf Die Neue Generation Von Starter-Generatoren Fur Kunftige Vier—Und Sechszylinder Benzinmotoren", Jun. 15, 2016, pp. 1-12, mbpassionblog, https//blog.mercedes-benz-passion.com/2016/06/entwicklung-des-48-voltbordnetzes-bei-der-daimler-ag/ (14 pages).
Chinese-language Office Action issued in Chinese Application No. 201980026953.6 dated Feb. 14, 2023 with English translation (12 pages).
German-language Office Action issued in German Application No. 10 2018 208 425.4 dated Jan. 31, 2023 (five (5) pages).

* cited by examiner

DRIVE TRAIN FOR A MOTOR VEHICLE, IN PARTICULAR FOR A CAR, AND METHOD FOR OPERATING SUCH A DRIVE TRAIN

BACKGROUND AND SUMMARY OF THE INVENTION

The invention relates to a drive train for a motor vehicle, in particular for a car. The invention furthermore relates to a method for operating such a drive train.

A drive train for a motor vehicle, in particular for a motor vehicle such as, for example, a passenger motor vehicle, is known from the general prior art and in particular from mass production of vehicles. The drive train has at least one internal combustion engine which has an output shaft. The motor vehicle by way of the output shaft is able to be driven by means of the internal combustion engine. To this end, the internal combustion engine, also referred to as a combustion engine, can provide torque by way of the output shaft, the motor vehicle being able to be driven by the torque output. In particular, road wheels of the motor vehicle can be driven by means of the internal combustion engine, on account of which the motor vehicle overall can be driven. Moreover, the drive train comprises at least one electric machine, by means of which the output shaft of the internal combustion engine is able to be driven in order for the internal combustion engine to be started, for example. In the context of a method for operating such a drive train it is thus provided, for example, that the motor vehicle by way of the output shaft of the internal combustion engine is driven by means of the internal combustion engine such that the internal combustion engine can be set in motion, that is to say started, by means of the electric machine in that the output shaft is driven by means of the electric machine.

EP 1 712 395 A2 furthermore discloses a device for temporarily increasing an acceleration of a combustion engine, the device having an electric motor which is connected to the combustion engine.

DE 10 2006 012 860 A1 discloses a method for operating a hybrid drive for a vehicle, having at least one combustion engine and having at least one electric motor, wherein the combustion engine and the electric motor are able to be operated in a hybrid operation.

A drive device having an internal combustion engine and having an electric machine is known from DE 10 2010 046 048 A1. A method for operating an electric machine can be derived as known from DE 10 2008 027 620 A1. DE 10 2014 105 424 A1 discloses a method for controlling a drive train system having an electromechanical gearbox, an internal combustion engine, and a turbocharger.

Moreover, an article from which a drive train for a motor vehicle having at least one output shaft for providing torque for driving the motor vehicle and an internal combustion engine having a full-load curve, the motor vehicle being able to be driven by way of the output shaft by means of the internal combustion engine, and having at least one electric machine which has an electric operating voltage of at most 60 volts and for supporting the internal combustion engine when driving the motor vehicle, is configured for driving the output shaft, could be accessed on Nov. 13, 2017 from the URL (Uniform Resource Locator) http://blog.mercedes-benz-passion.com/2016/06/entwicklung-des-48-volt-bord-netzes-bei-der-daimler-ag/.

Moreover, an article pertaining to 48 V systems of hybrid vehicles could be accessed on Nov. 13, 2017 from the URL http://www.vdi-nachrichten.com/Technik-Wirtschaft/48-Volt-Systeme-Hybridfahrzeugen/Durchbruch-verhelfen.

It is an object of the present invention to refine a drive train and a method of the type mentioned at the outset in such a manner that a particularly advantageous operation is able to be implemented in a manner which is particularly favorable in terms of installation space and weight.

This object is achieved according to the invention by a drive train as well as by a method according to the independent claims. Advantageous design embodiments of the invention are the subject matter of the dependent claims.

A first aspect of the invention relates to a drive train for a motor vehicle, in particular for a motor car such as, for example, a passenger motor car. The drive train comprises an internal combustion engine which has an output shaft. The motor vehicle, by way of the output shaft, is able to be driven via the internal combustion engine. To this end, the internal combustion engine, for example by way of the output shaft thereof, can provide torque by which the motor vehicle can be driven. In particular, road wheels of the motor vehicle and thus the motor vehicle overall can be driven by means of the torque provided by the internal combustion engine by way of the output shaft. The drive train furthermore comprises at least one electric machine.

Furthermore, the incoming electric machine has an electric operating voltage of at most 60 volts and, for supporting the internal combustion engine when driving the motor vehicle, is configured for driving the output shaft. In other words, the electric machine is configured for driving the output shaft, in particular while the motor vehicle by way of the output shaft is driven by the internal combustion engine, so as to on account thereof support the internal combustion engine when driving the motor vehicle. To this end, the output shaft can at least temporarily provide a particularly high torque for driving, in particular for accelerating, the motor vehicle, wherein this high torque emanates from the internal combustion engine per se, or from the fired operation of the latter, respectively, and from the driving action of the output shaft caused by the electric machine. Yet again in other words, the torque which is provided by the output shaft is an overall torque, for example, which comprises a first torque that is provided by the internal combustion engine per se, and a second torque that is provided by the electric machine and acts on the output shaft.

In order to now implement a particularly advantageous operation of the drive train and thus of the motor vehicle overall in a manner which is particularly favorable in terms of installation space and weight, it is provided according to the invention that the drive train has at least one first operating state in which the electric machine supports the internal combustion engine when driving the motor vehicle in at least one rotational speed range of the internal combustion engine in such a manner that a torque provided by the output shaft exceeds the full-load curve and undershoots the maximum torque of the full-load curve. Alternatively or additionally, the drive train according to the invention has at least one second operating state in which the electric machine supports the internal combustion engine when driving the motor vehicle in such a manner that a torque provided by the output shaft exceeds the full-load curve and the maximum torque of the full-load curve.

As is known in general, the full-load curve is a profile of the maximum torque that can be provided solely by the internal combustion engine by way of the output shaft, that is to say without any support of the electric machine, the profile being a function of the rotational speed, that is to say a function of the rotational speed of the internal combustion engine or of the output shaft, respectively, in particular in a torque diagram or a load/torque diagram also referred to as an engine map. The maximum torque of the full-load curve herein is the highest torque, or the highest value of the full-load curve, respectively. In other words, the maximum torque of the full-load curve is the maximum torque of the internal combustion engine, that is to say the maximum torque which can be provided, in particular solely, by the internal combustion engine by way of the output shaft, consequently the maximum of the full-load curve. As is furthermore known in general, the full-load curve has the maximum value thereof not in each rotational speed range, that is to say at each rotational speed of the internal combustion engine, so that the internal combustion engine has the maximum torque, or can provide the latter, respectively, only in at least one part of the full-load curve that corresponds to a rotational speed range of the output shaft, or of the internal combustion engine, respectively. The maximum torque usually lies in a central part of the full-load curve and thus in a central rotational speed range, while the full-load curve in rotational speed ranges which are lower and higher in comparison to the central rotational speed range has values which are lower than the maximum value.

It is provided according to the invention herein that the electric machine supports the internal combustion engine when driving the motor vehicle, for example, in at least one lower and/or higher rotational speed range in comparison to the central rotational speed range with the maximum torque in such a manner that the torque which is provided by the output shaft of the internal combustion engine indeed exceeds the full-load curve but undershoots the maximum torque, that is to say the maximum value of the full-load curve.

Alternatively or additionally, the electric machine supports the internal combustion engine when driving the motor vehicle in the central rotational speed range, for example, in such a manner that the torque provided by the output shaft for driving the motor vehicle exceeds the full-load curve and the maximum torque, that is to say the maximum value of the full-load curve.

The operating voltage is in particular a nominal voltage, wherein requirements in terms of shock-proof protection can be avoided or kept particularly low on account of the operating voltage or nominal voltage, respectively, being very low. In the case of recuperation in which the electric machine is operated as a generator and herein is driven by kinetic energy of the motor vehicle, in particular by way of at least one road wheel of the moving motor vehicle, for example, electric voltages, in particular operating voltages, of more than 58 volts can arise, these however being significantly below 60 volts and thus below the so-called shock-proof protection limit.

By means of the electric machine it is thus possible for the first torque to be increased by the second torque and on account thereof for the overall torque to be provided, such that an increase in torque can be implemented by means of the electric machine. On account thereof, the motor vehicle can at least temporarily be accelerated in a particularly intense manner, for example, so that a so-called boost operation, or a boost function, respectively, can be implemented by means of the electric machine in the context of driving the motor vehicle, or while the motor vehicle is being driven, respectively. The number of parts, the installation space requirement, the costs, and the weight of the drive train herein can be kept particularly low.

The method according to the invention, or the respective transgression of the full-load curve, respectively, apply to the stationary case but in particular also to the non-stationary case, thus when the internal combustion engine on account of the sluggish charging technology optionally provided therefore has not yet reached the maximum potential torque thereof at the respective operating point or at the respective rotational speed, respectively. The term charging technology is in particular to be understood that a compressor is provided, for example, by means of which the air to be supplied to the internal combustion engine is compressed, or can be compressed, respectively.

In order for a particularly advantageous operation to be implemented in a manner which is particularly favorable in terms of installation space, weight, and cost, it is preferably provided that the electric operating voltage, in particular the nominal voltage, of the electric machine is at most 50 volts, in particular at most 48 volts.

In one particularly advantageous design embodiment of the invention it is provided that the electric machine for starting the internal combustion engine is configured for driving the output shaft of the internal combustion engine. In other words, in order for the internal combustion engine to be started or to be set in motion, respectively, and thus to be converted from a deactivated state to an activated state, and herein in particular to a fired operation of the internal combustion engine, the output shaft, which is configured as a crankshaft, for example, is driven by the electric machine. To this end, the electric machine is operated in the operation as a motor and thus as an electric motor, for example, the electric motor providing torques for driving the output shaft. In the context of starting the internal combustion engine, for example, the output shaft is driven by the electric machine at least until combustion procedures take place in a combustion chamber of the internal combustion engine that is configured as a cylinder, for example, the output shaft then being driven by means of the combustion procedures.

The electric machine can be configured, for example, as a belt starter generator or as a drive or crankshaft starter generator, the rotor of the generator potentially being disposed, for example, on the output shaft which is in particular configured as a crankshaft. It is furthermore conceivable that the electric machine is integrated in a gearbox which is able to be driven by the internal combustion engine by way of the output shaft of the latter, such that the electric machine can be configured, for example, as an integrated starter generator. It is furthermore conceivable that the electric machine is integrated in the internal combustion engine, in particular in the engine housing of the latter. Moreover, the electric machine can be used with or without a separating clutch.

In principle, it is conceivable for the internal combustion engine to be set in motion, or to be started, respectively, by means of at least one additional starter installation which is different from the electric machine and is provided in addition to the latter. Such an additional starter installation is, for example, a pinion starter which is used for implementing a motor starting function.

The number of parts and thus the installation space requirement and the weight can however be kept particularly low since the electric machine has at least a dual function. On the one hand, the electric machine is utilized for starting, or setting in motion, respectively, the internal combustion engine. On the other hand, the electric machine is utilized for supporting the internal combustion engine when driving the motor vehicle and thus for implementing the boost operation, for example. The electric machine for supporting the internal combustion engine when driving the motor vehicle is in particular configured for driving, in particular in a mechanical and/or direct manner, the output shaft. The electric machine, in particular by way of the rotor thereof, thus acts mechanically on the output shaft.

The invention herein is in particular based on the following concept: hybrid drives for motor vehicles usually comprise at least one combustion engine and at least one electric machine which is in particular configured as an electric motor. The use of such an electric machine in a hybrid drive enables undesired effects of the internal combustion engine, or of the combustion engine, respectively, to be avoided in particular by a clever actuation of the electric machine. This is the case in particular with turbo-charged combustion engines, because the so-called turbo lag can be bridged, that is to say compensated, by means of the electric machine by correspondingly actuating the electric machine and in particular by the afore-mentioned exaggerated torque. To this end, the combustion engine when driving the motor vehicle is supported by means of the electric machine. By means of the electric machine it is possible to feed outputs provided by the electric machine into the drive train, in particular as a function of a desired acceleration or of a desired or required torque, respectively.

In such a conventional hybrid drive the combustion engine is in most instances embodied so as to be smaller than in a conventional drive train in which only the combustion engine but not an electric machine is used for driving the motor vehicle. On account of this embodiment of the internal combustion engine or the combustion engine, respectively, which is smaller in comparison to a conventional drive train the internal combustion engine has less output in comparison to the conventional drive train, wherein a difference between the output of the internal combustion engine in a conventional drive train and the output of the internal combustion engine in a hybrid drive can be at least partially, in particular at least largely or completely, compensated for by means of the electric motor.

The electric machine, or the electric motor, respectively, is thus used as a hybrid motor in order to support the combustion engine when driving the motor vehicle. The hybrid motor is usually a high-voltage component which has an electric operating voltage of more than 50 volts, in particular of several hundred volts. Such a hybrid motor is thus usually an electric machine which is specifically or specially installed, respectively, and which, in particular in comparison to a conventional drive train, requires additional installation space and leads to an increased weight of the motor vehicle.

These issues and disadvantages can now be avoided by means of the drive train according to the invention, since the drive train is not implemented as a special hybrid drive train having a hybrid motor installed for drive purposes, but because the drive train according to the invention proceeds from a conventional drive train and utilizes the internal combustion engine which is anyway provided in such a conventional drive train as a combustion engine. Furthermore, the drive train according to the invention, proceeding from a conventional drive train, utilizes the electric machine, the function thereof for starting or setting in motion, respectively, the internal combustion engine being enhanced by the function for supporting the internal combustion engine when driving the motor vehicle.

The electric machine is, for example, a crankshaft starter generator which is disposed, for example, so as to be coaxial with the output shaft which is configured as a crankshaft, for example, and is connected in a rotationally fixed manner, or is able to be connected in a rotationally fixed manner, to the output shaft. It is furthermore conceivable that the electric machine is a belt starter generator, the rotation axis of the latter being disposed so as to be axially offset to a rotation axis of the output shaft and, for example, runs parallel to the rotation axis of the output shaft.

The electric operating voltage of the electric machine herein is not or only slightly increased in comparison to the conventional drive train, for example, and herein is at most 60 volts, in particular at most 50 volts, wherein the electric operating voltage is preferably less than 60 volts, in particular less than 50 volts, and preferably is at least 12 volts, or more than 12 volts. On account thereof, the electric machine which is preferably able to be operated as an electric motor has sufficient available output so as to not only start the internal combustion engine but also so as to support the internal combustion engine, for example in dynamic load states, by an additionally infed torque, in that the electric machine provides a torque which is transmitted to the output shaft. On account thereof, a supporting torque in the context of which the output shaft is driven not only by combustion procedures taking place in the internal combustion engine, in particular in at least one combustion chamber of the internal combustion engine that is configured as a cylinder, for example, but additionally also by a torque provided by the electric machine. This supporting torque can be utilized, for example, for bridging instances of turbo lag and/or for the exaggerated torque described above, so as to implement a particularly high maximum drive torque for driving the motor vehicle. It is furthermore conceivable for the supporting torque to be utilized in dynamic load states so as to implement a particularly advantageous response behavior of the internal combustion engine. On account of the supporting torque it is possible, for example, to accelerate the output shaft and thus the motor vehicle in a particularly intense manner and thus up to high rotational speeds in a short time.

In contrast to special hybrid vehicles which usually have available at least one high-voltage electric motor with several hundred Volts, which can be operated as a generator as well as an electric motor, the drive train according to the invention does not require any additional electric motor, since the electric machine which is anyway used in a conventional drive train is used in particular as a low-voltage component having an electric operating voltage of less than 60 volts, in particular less than 50 volts. In comparison to a conventional drive train, the electric machine is merely embodied so as to be stronger, for example, in that the electric operating voltage of the electric machine is increased and/or in that the electric machine is incorporated in the drive train at another location in comparison to the conventional drive train. On account thereof, the installation space requirement as well as the weight of the drive train can be kept in a particularly small range.

In an advantageous design embodiment of the invention, the electric operating voltage of the electric machine is at most 48 volts. On account thereof, the afore-mentioned boost function can be designed as a 48 V boost function for example, so that the installation space requirement and the weight of the drive train can be kept particularly low, on the one hand, and sufficiently intense accelerations of the output shaft and of the motor vehicle overall can be guaranteed by means of the electric machine, on the other hand.

In particular, different types of the boost function, or different stages of specifications thereof, respectively, in particular of the 48 V boost function are possible. For example, the boost function can be utilized in order to compensate a non-stationary behavior of a turbocharger, or of turbocharging, respectively, of the internal combustion engine in order to avoid the so-called turbo lag or to at least keep the latter minor. The stationary full-load curve of the internal combustion engine herein is not transgressed, for example, but a more dynamic response behavior is able to be implemented.

Furthermore, an at least brief or temporary, respectively, transgression of the full-load curve of the internal combustion engine can be implemented, in particular in the lower and upper rotational speed range, but not beyond the maximum torque of the internal combustion engine, this maximal torque usually arising in the central rotational speed range. Moreover, a transgression of the stationary full-load curve of the internal combustion engine beyond the maximum torque thereof can be caused in that a torque which is provided by the electric machine, for example, and is transmitted to the output shaft and which is also referred to as the 48 V torque, for example, is added at least in almost all rotational speed ranges.

In one particular advantageous embodiment of the invention the electric machine has a stator and a rotor which about a rotation axis is rotatable relative to the stator and which is disposed so as to be coaxial with the output shaft. On account thereof, the installation space requirement can be kept particularly low. The rotor herein is disposed on the output shaft, for example.

In order for the number of parts and the weight to be kept particularly low, it is provided in a further design embodiment of the invention that the rotor is connected in a rotationally fixed manner to the output shaft.

In order for a particularly efficient operation to be implemented, it is provided in one further embodiment of the invention that the electric machine in a generator operation is able to be operated as a generator which is able to be driven, or is driven, respectively, by the output shaft. In the generator operation, the output shaft which is driven, for example, by the combustion procedures taking place in the internal combustion engine provides mechanical energy which is supplied to the generator. The generator is thus driven by the mechanical energy. At least part of the mechanical energy is converted to electric energy by means of the generator, the electric energy being provided by the generator. The electric energy provided by the generator can be supplied, in particular directly, to at least one electrical consumer of the drive train, for example, and/or be fed into at least one energy accumulator which is configured for accumulating electric energy or electric current, respectively, and which is configured as a battery, in particular as a low-voltage battery, for example. The energy accumulator herein preferably has an electric voltage, in particular an electric operating voltage, which is at most 60 volts, in particular at most 50 volts, and is preferably less than 60 volts, in particular less than 50 volts, and is at least 12 volts, or more than 12 volts. The electric voltage, in particular the electric operating voltage, of the energy accumulator is in particular 48 volts. The electric machine herein is able to be supplied with electric energy stored in the energy accumulator, for example, on account of which the electric machine in the motor operation and thus as an electric motor can be operated by means of the electric energy stored in the energy accumulator, for example.

A second aspect of the invention relates to a method for operating a drive train for a motor vehicle, in particular a drive train according to the invention. In the method, the motor vehicle is driven by means of an internal combustion engine having an output shaft, in that the motor vehicle by way of the output shaft is driven by the internal combustion engine, for example. The drive train furthermore has at least one electric machine.

The electric machine herein is operated at an electric operating voltage of at most 60 volts, in particular at most 50 volts, while the electric machine drives the output shaft so as to on account thereof support the internal combustion engine when driving the motor vehicle.

In order to now implement a particularly advantageous operation in a favorable manner in terms of installation space and weight, it is provided according to the invention that the drive train is operated in at least one first operating state, in which the electric machine supports the internal combustion engine when driving the motor vehicle in a at least one rotational speed range of the internal combustion engine, in such a manner that a torque provided by the output shaft exceeds the full-load curve and undershoots the maximum torque of the full-load curve. Alternatively or additionally, it is provided that the drive train is operated in at least one second operating state, in which the electric machine supports the internal combustion engine when driving the motor vehicle, in such a manner that a torque provided by the output shaft exceeds the full-load curve and the maximum torque of the full-load curve. Advantages and advantageous design embodiments of the first aspect of the invention are to be considered as advantages and advantageous design embodiments of the second aspect of the invention and vice versa.

It has proven particularly advantageous for the internal combustion engine to be started by means of the electric machine in that the output shaft is driven by means of the electric machine.

Further details of the invention are derived from the description hereunder of a preferred exemplary embodiment and the appended drawings.

DETAILED DESCRIPTION OF THE DRAWINGS

Figure 1:
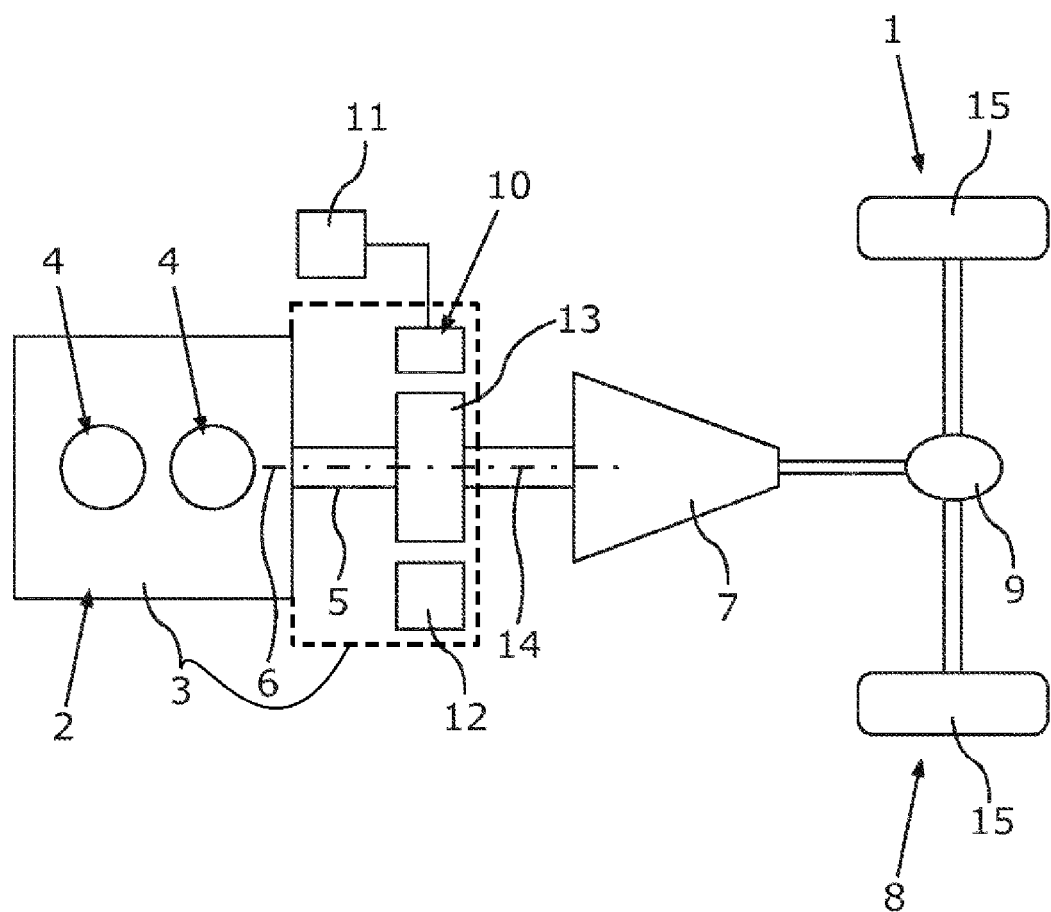
FIG. 1 is a schematic illustration of a drive train according to an embodiment of the invention for a motor vehicle, in particular for a car.

FIG. 1, in a schematic illustration, shows a drive train 1 for a motor vehicle, in particular for a car such as, for example, a passenger motor car. The drive train 1 comprises at least one internal combustion engine 2 which is also referred to as a combustion engine. The internal combustion engine 2 in the exemplary embodiment visualized in the figures is configured as a reciprocating piston machine. The internal combustion engine 2 herein comprises a engine housing 3 which is configured as a crankcase, in particular as a cylinder crankcase, by way of which at least one combustion chamber 4 of the internal combustion engine 2 is formed. It can be seen from FIG. 1 that a plurality of combustion chambers 4 of the internal combustion engine 2 are formed by the engine housing 3. The respective combustion chamber 4 herein is configured as a cylinder.

The internal combustion engine 2 has an output shaft 5 which is configured as a crankshaft, for example. The output shaft 5 is rotatably mounted on the engine housing 3 and can thus rotate about a rotation axis 6 relative to the engine housing 3. A piston which cannot be seen in the figures is received so as to be movable in particular in a translatory manner in the respective combustion chamber 4 such that the respective piston can be moved in a reciprocating translatory manner relative to the engine housing 3, for example. The respective piston is coupled in an articulated manner to a con-rod, which in turn is coupled in an articulated manner to the output shaft 5. On account of this articulate coupling of the respective piston to the output shaft 5 by way of the respective con-rod the respective translatory movements of the respective piston can be converted to a rotating movement of the output shaft 5 about the rotation axis 6 thereof relative to the engine housing 3.

During a fired operation of the internal combustion engine 2, that is to say while the internal combustion engine 2 is activated, combustion procedures take place in the respective combustion chamber 4. The respective piston is driven on account of these combustion procedures so that the respective piston by way of the con-rod exerts a torque on the output shaft 5. On account thereof, the output shaft 5 is driven by the combustion procedures taking place in the internal combustion engine 2, in particular in the combustion chambers 4 and on account thereof is rotated about the rotation axis 6 relative to the engine housing 3. On account thereof, the output shaft 5, or the internal combustion engine 2, respectively, by way of the output shaft 5 makes available at least a torque by means of which road wheels 15 of the drive train 1 and thus the motor vehicle overall can be driven.

The drive train 1 comprises a gear box 7 which is also referred to as the main gearbox and by way of which the torques provided by the internal combustion engine 2 by way of the output shaft 5 can be transmitted to the road wheels 15. The road wheels 15 herein are road wheels of an axle 8 of the drive train 1, wherein the axle 8 is configured as a rear axle or else as a front axle, for example. The axle 8 herein has a differential 9 which is also referred to as an axle gearbox or a differential gear box and by way of which the road wheels 15 can be driven by the internal combustion engine 2, that is to say by the output shaft 5.

The drive train 1 furthermore has at least one electric machine 10 by means of which the output shaft 5 of the internal combustion engine 2 can be driven for starting the internal combustion engine 2. In the context of a method for operating the drive train 1, it is thus provided that the road wheels 15 and thus the motor vehicle overall are driven by the internal combustion engine 2 by way of the output shaft 5. It is furthermore provided in the context of the method that the internal combustion engine 2 is started, that is to say set in motion, by means of the electric machine 10 in that the output shaft 5 is driven by means of the electric machine 10. Starting, or setting in motion, respectively, the internal combustion engine 2 is to be understood that the internal combustion engine 2 is converted from the deactivated or non-fired state, respectively, thereof to the fired state by starting the internal combustion engine 2. In the context of the starting of the internal combustion engine 2, the output shaft 5 is driven by the electric machine 10 at least until the output shaft 5 by way of the pistons is driven by the combustion procedures taking place in the combustion chambers 4, for example.

In order for the output shaft 5 to be driven and thus the internal combustion engine 2 to be started, the electric machine 10 is operated in a motor operation and thus as an electric motor. To this end, the drive train 1 comprises an energy accumulator 11, for example, which is configured for storing electric energy or electric current, respectively, and which is configured as a battery, in particular as a low-voltage battery, for example. In the motor operation, the electric machine 10 is supplied with electric energy stored in the energy accumulator 11 and on account thereof is operated as an electric motor.

In order for a particularly advantageous operation of the drive train 1 and thus of the motor vehicle overall to now be implemented and for the weight and the installation space requirement of the drive train 1 herein to be held particularly low, the electric machine 10 has an operating voltage of at most 50 volts, in particular an operating voltage of less than 50 volts. The electric operating voltage of the electric machine 10 is in particular 48 volts, so that the electric machine 10 is embodied, for example, as a 48 V machine or as a 48 V system, respectively. The electric operating voltage of the electric machine 10 is preferably at least 12 volts or more than 12 volts.

The electric machine 10 for supporting the internal combustion engine 2 when driving the road wheels 15 and thus the motor vehicle overall is furthermore configured for driving the output shaft 5. In other words, it is provided in the context of the mentioned method that the electric machine 11 is operated at an electric operating voltage of at most 50 volts, preferably of less than 50 volts, wherein the electric machine 10 as an electric motor for supporting the internal combustion engine 2 when driving the motor vehicle drives the output shaft 5.

The electric machine 10 is thus preferably configured as a low-voltage component, the electric operating voltage of the latter being less than 50 volts, in particular DC or AC. The energy accumulator 11 is thus preferably also configured as a low-voltage component, the electric operating voltage of the latter being less than 50 volts, in particular AC or DC. In other words, the energy accumulator 11 preferably provides an electric voltage of at most 50 volts with which the electric machine 10 is supplied in particular in the motor operation.

The drive train 1 is thus not configured as a special hybrid drive which has an internal combustion engine which is designed so as to be weaker in comparison to a conventional drive train and has an extra specifically installed hybrid motor, but the drive train 1 is conceived proceeding from a conventional drive train so that the internal combustion engine 2 in the drive train 1 is a normal combustion engine which is used in a conventional drive train, and the electric machine 10 is the electric machine which is already used in the conventional drive train, or is already present therein, respectively. On account of the electric operating voltage of the electric machine 10 being at most 50 volts, the installation space requirement and the weight of the drive train 1 can be kept low, on the one hand. On the other hand, the electric machine 10 can provide sufficiently high electric outputs and torques for supporting the internal combustion engine 2 when driving the motor vehicle.

In order for the required space herein to be kept particularly low, the electric machine 10 has a stator 12 and a rotor 13 which about a rotation axis 14 is rotatable relative to the stator 12 and in particular relative to the engine housing 3. The rotor 13 herein is disposed so as to be coaxial with the output shaft 5 such that the rotation axis 14 coincides with the rotation axis 6. The rotor 13 herein is disposed on the output shaft 5 and/or is connected in a rotationally fixed manner to the output shaft 5, for example.

It is furthermore conceivable for the electric machine 10 in a generator operation to be able to be operated as a generator which is driven by the output shaft 5. On account thereof, part of the mechanical energy which by way of the output shaft 5 is provided by the internal combustion engine 2 and is supplied to the generator, for example, can be converted to electric energy by means of the generator, the electric energy being able to be stored in the energy accumulator 11, for example. A load point shift or a recuperation operation, respectively, can be implemented on account thereof.

On account of the possibility of the output shaft 5 being driven by combustion procedures taking place in the internal combustion engine 2 as well as by the electric machine 10, the output shaft 5 can provide a particularly high drive torque by means of which the rotation axis 6 can be driven. This drive torque is an overall moment or an overall torque which comprises a first torque and a second torque. The first torque results from the output shaft 5 being driven by the piston by means of the combustion procedures taking place in the internal combustion engine 2. The second torque is provided by the electric machine 10 and is transmitted to the output shaft 5. On account thereof, the first torque can be increased by the second torque so as to form the overall torque such that an exaggerated torque, or a supporting torque, respectively, can be implemented by means of the electric machine 10. On account of this supporting torque, the output shaft 5 can at least be temporarily accelerated in a particularly intense manner and thus accelerated up to high rotational speeds in a short time, for example, on account of which the motor vehicle overall can be accelerated. A particularly advantageous boost operation can be implemented on account thereof.

It is furthermore conceivable for instances of turbo lag to be compensated by the supporting torque, in particular when the internal combustion engine 2 is configured as a charged internal combustion engine. To this end, an exhaust turbocharger which has a turbine and a compressor is provided, for example. The turbine is able to be driven by exhaust gas from the combustion chambers 4, for example, wherein the compressor is able to be driven by the turbine. Air which is supplied to the combustion chambers 4 can be compressed by means of the compressor, on account of which a particularly efficient operation of the internal combustion engine 2 is implementable. Furthermore, the electric machine 10 on account of the supporting torque can be utilized in dynamic load states in order to support the internal combustion engine 2 when driving the motor vehicle. A particularly advantageous response behavior of the internal combustion engine 2, or of the drive train 1 overall, respectively, can be implemented on account thereof.

Figure 2:
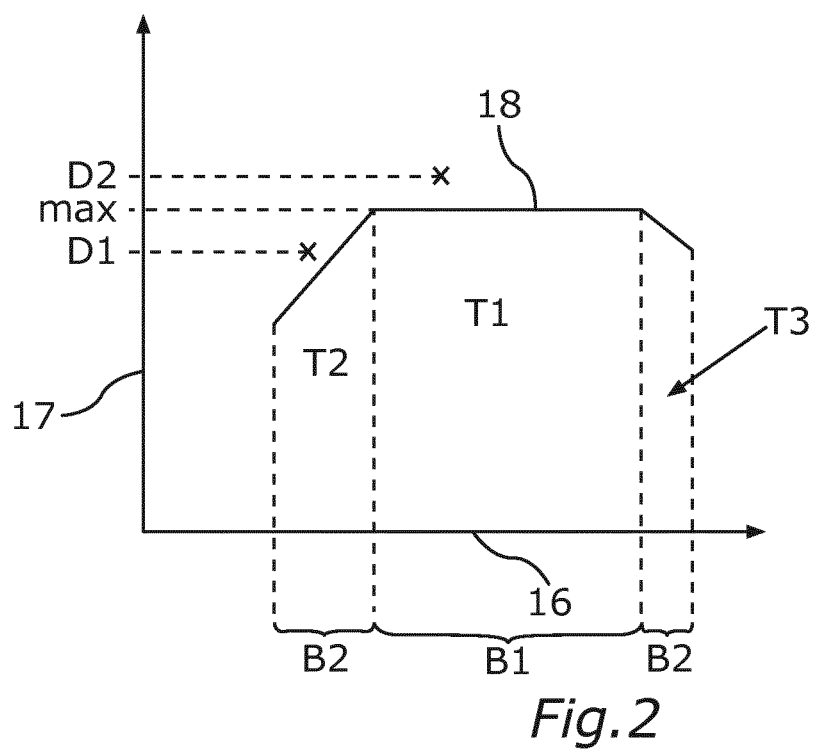
FIG. 2 is a schematic illustration of the engine map of an internal combustion engine of the drive train.

FIG. 2 schematically shows the engine map of the internal combustion engine 2. The engine map is a torque diagram, or a load/torque diagram, respectively. The rotational speed of the output shaft 5 and thus of the internal combustion engine 2 is plotted on the abscissa 16 of the diagram. The load, or the torque which by way of the output shaft 5 is provided by the output shaft 5, that is to say solely by the internal combustion engine 2 and thus without any support of the electric machine 10, in particular for driving the road wheels 15 and thus the motor vehicle, respectively, is plotted on the ordinate 17. The internal combustion engine 2 furthermore has a full-load curve 18 which is shown in the engine map. The full-load curve 18 is a profile of the maximum torque which, by way of the output shaft 5, is able to be provided solely by the internal combustion engine 2, that is to say without any support of the electric machine 10. The profile is a function of the rotational speed of the internal combustion engine 2. The respective torque which, by way of the output shaft 5, is provided solely by the internal combustion engine 2 is also referred to as the load so that the load at which, or by way of which, the internal combustion engine 2 is operated is plotted on the ordinate 17.

It can be particularly readily seen from FIG. 2 that the full-load curve 18 in the central part T1 thereof has its maximum value, that is to say the highest or largest value, consequently the maximum of the full-load curve 18. The central part T1 corresponds to a first or central, respectively, rotational speed range B1 of the internal combustion engine 2. The maximum value of the full-load curve is the maximum torque max of the full-load curve 18, that is to say the highest or largest torque that lies on the full-load curve. In other words, the largest value of the full-load curve 18, that is to say the maximum torque max of the full-load curve 18, is the maximum torque which in terms of the full-load curve 18 overall is able to be provided by way of the output shaft 5 solely by the internal combustion engine 2. In a second part T2 and in a third part T3 the full-load curve has exclusively values which are smaller in comparison to the largest value of the full-load curve 18. The part T2 herein corresponds to a rotational speed range B2 which is lower in comparison to the rotational speed range B1, respectively, wherein the part T3 corresponds to a rotational speed range B3 which is higher in comparison to the rotational speed range B1 or above the latter, respectively. The internal combustion engine 2 on its own, by way of the output shaft 5, can thus provide the maximum torque max only in the rotational speed range B1 but not in the rotational speed ranges B2 and B3.

In order for a particularly advantageous mobility to be implemented, it is provided, for example, that the drive train 1 has at least one first operating state in which the electric machine 10 supports the internal combustion engine 2 when driving the motor vehicle in the rotational speed range B2 and/or in the rotational speed range B3 in such a manner that a torque provided by the output shaft 5 exceeds (transgresses) the full-load curve 18 and the maximum torque max undershoots the full-load curve 18. The first operating state in FIG. 2 is visualized using the example of the rotational speed range B2. The internal combustion engine 2 in the rotational speed range B2 solely can at most provide the respective torque that lies on the full-load curve 18. The electric machine 10 however now supports the internal combustion engine 2 in such a manner that the output shaft 2 provides a torque D1 which exceeds the full-load curve 18 but undershoots the maximum torque max.

Alternatively or additionally, it can be provided that the drive train 1 has at least one second operating state in which the electric machine 10 supports the internal combustion engine 2 when driving the motor vehicle in such a manner that a torque D2 provided by the output shaft 5 exceeds the full-load curve 18 and the maximum torque max of the full-load curve 18, or of the internal combustion engine 2 alone, respectively. The second operating state can also be particularly readily seen in FIG. 2. The electric machine 10 supports the internal combustion engine 2 when driving the motor vehicle in the rotational speed range B1 in such a manner that the output shaft 5 provides the torque D2 which is greater than the maximum torque max, wherein the internal combustion engine 2 in the rotational speed range B1 solely can provide at most the maximum torque max. In the respective operating state, the internal combustion engine 2 by way of the output shaft 5 provides a respective first torque that lies on the full-load curve 18, for example, or a first torque which is lower in comparison to the full-load curve 18; meanwhile, the electric machine 10 however provides a second torque so that the sum of the first torque provided solely by the internal combustion engine 2 and of the second torque provided by the electric machine 10 results in the respective torque D1 or D2, respectively, each being greater than the first torque and exceeding the full-load curve 18. A particularly advantageous operation of the motor vehicle can be implemented in a manner favorable in terms of costs and weight on account thereof.

LIST OF REFERENCE SIGNS

1 Drive train
2 Internal combustion engine
3 Engine housing
4 Combustion chamber
5 Output shaft
6 Rotation axis
7 Gearbox
8 Axle
9 Differential
10 Electric machine
11 Energy accumulator
12 Stator
13 Rotor
14 Rotation axis
15 Road wheel
16 Abscissa
17 Ordinate
18 Full-load curve
B1 Rotational speed range
B2 Rotational speed range
B3 Rotational speed range
D1 Torque
D2 Torque
max Maximum torque
T1 Part
T2 Part
T3 Part

What is claimed is:

1. A drive train for a motor vehicle, comprising:
at least one output shaft for providing torques for driving the motor vehicle;
an internal combustion engine which has a full-load curve and by which the motor vehicle is able to be driven via the output shaft; and
at least one electric machine, which has an electric operating voltage of at most 60 volts and which supports the internal combustion engine when driving the motor vehicle, is configured for driving the output shaft, and wherein the at least one electric machine comprises a stator and a rotor, and wherein the rotor is rotatable about a rotation axis relative to the stator which is disposed so as to be coaxial with the output shaft,
wherein:
the drive train has at least one operating state in which the electric machine supports the internal combustion engine when driving the motor vehicle in at least one rotational speed range of the internal combustion engine such that a torque provided by the output shaft exceeds a full-load curve and undershoots a maximum torque of the full-load curve; and
the drive train has at least one second operating state in which the electric machine supports the internal combustion engine when driving the motor vehicle such that a torque provided by the output shaft exceeds the full-load curve and the maximum torque of the full-load curve.

2. The drive train according to claim 1, wherein the electric operating voltage of the electric machine is at most 50 volts.

3. The drive train according to claim 1, wherein the electric operating voltage of the electric machine is at most 48 volts.

4. The drive train according to claim 1, wherein the electric machine for starting the internal combustion engine is configured for driving the output shaft of the internal combustion engine.

5. The drive train according to claim 1, wherein the rotor is connected in a rotationally fixed manner to the output shaft.

6. The drive train according to claim 1, wherein the electric machine, in a generator operation, is able to be operated as a generator driven by the output shaft.

7. The drive train according to claim 1, wherein the at least one electric machine is integrated in a gearbox that is configured to be driven by the internal combustion engine via the output shaft.

8. The drive train according to claim 1, wherein the at least one electric machine is integrated in an engine housing of the internal combustion engine.

9. A method for operating a drive train for a motor vehicle, the drive train having at least one electric machine, wherein the motor vehicle is driven by an internal combustion engine of the drive train, the internal combustion engine having an output shaft, and, for supporting the internal combustion engine when driving the motor vehicle, drives the output shaft and wherein the electric machine has a rotor that is coaxial with the output shaft;
the method comprising:
operating the electric machine at an operating voltage of at most 60 volts;
operating the drive train in at least one operating state in which the electric machine supports the internal combustion engine when driving the motor vehicle in at least one rotational speed range of the internal combustion engine such that a torque provided by the output shaft exceeds a full-load curve and undershoots a maximum torque of the full-load curve; and
operating the drive train in at least one second operating state in which the electric machine supports the internal combustion engine when driving the motor vehicle such that a torque provided by the output shaft exceeds the full-load curve and the maximum torque of the full-load curve.

10. The method according to claim 9, wherein the internal combustion engine is started by the output shaft being driven by the electric machine.

11. The method according to claim 9, wherein the electric machine is integrated in a gearbox that is configured to be driven by the internal combustion engine via the output shaft.

12. The method according to claim 9, wherein the electric machine is integrated in an engine housing of the internal combustion engine.

* * * * *